United States Patent [19]
Dowd et al.

[11] Patent Number: 4,981,322
[45] Date of Patent: * Jan. 1, 1991

[54] ASSIST STRAP FOR A MOTOR VEHICLE

[75] Inventors: James D. Dowd, Farmington Hills; David M. Hilborn, Sterling Heights; Matthew J. Brown, Rochester Hills, all of Mich.

[73] Assignee: United Technologies Corporation, Inc., Dearborn, Mich.

[*] Notice: The portion of the term of this patent subsequent to Jan. 1, 2008 has been disclaimed.

[21] Appl. No.: 204,670

[22] Filed: Jun. 10, 1988

[51] Int. Cl.$^5$ .......................... B60N 3/02; B60R 13/02
[52] U.S. Cl. ...................... 296/214; 411/41; 411/45; 24/297; 24/453
[58] Field of Search ............ 296/214, 39.1, 39.2, 296/97.1, 97.13; 411/41, 40, 42, 43, 45, 48, 508; 24/297, 453

[56] References Cited

U.S. PATENT DOCUMENTS

| | | | |
|---|---|---|---|
| 2,191,780 | 2/1940 | Tinnerman | 24/297 X |
| 2,317,315 | 4/1943 | Wallace | 24/453 X |
| 3,017,217 | 1/1962 | Keating | 296/97.13 |
| 3,433,525 | 3/1969 | Avgunas | 296/97.1 |
| 3,650,173 | 3/1972 | Mathe | 411/45 |
| 4,067,602 | 1/1978 | Ahlisch et al. | 296/71 |
| 4,356,592 | 11/1982 | Moore | 16/125 |
| 4,357,734 | 11/1982 | Moore | 16/125 |
| 4,373,229 | 2/1983 | Moore | 16/125 |
| 4,404,709 | 9/1983 | Janz et al. | 16/111 R |
| 4,571,134 | 2/1986 | Beglinger et al. | 411/41 |
| 4,610,478 | 9/1986 | Tervol | 296/214 |
| 4,686,609 | 8/1987 | Dykstra et al. | 362/61 |

FOREIGN PATENT DOCUMENTS 0183243  9/1985  Japan .................... 24/297

OTHER PUBLICATIONS

"The Hartwell Corporation"-Technical Bulletin on NYLATCH.

Primary Examiner—Dennis H. Pedder
Assistant Examiner—Andrew C. Pike

[57] ABSTRACT

An assist strap is installed by rotating an assist strap handle to drive a mandrel, in the base of the assist strap, into a projection in a service on which the assist strap is mounted. An apparatus for mounting an assist strap in a motor vehicle includes projecting fastening means extending from the base of the assist strap and a mandrel mounted to slide between a first position disengaged from the fastening means and a second position wherein the mandrel engages the fastening means to limit the movement of the fastening means thereby locking the fastening means to the vehicle body structure. A handle may be mounted to the base for pivotal movement such that applying a force to the handle drives the mandrel from the first position to the second position. Additionally, the handle may be secured in a preassembly position utilizing a breakaway tab such that the force necessary to drive the mandrel from the first position to the second position is less than the force required to rupture the breakaway tab securing the handle in a preassembled position.

19 Claims, 3 Drawing Sheets

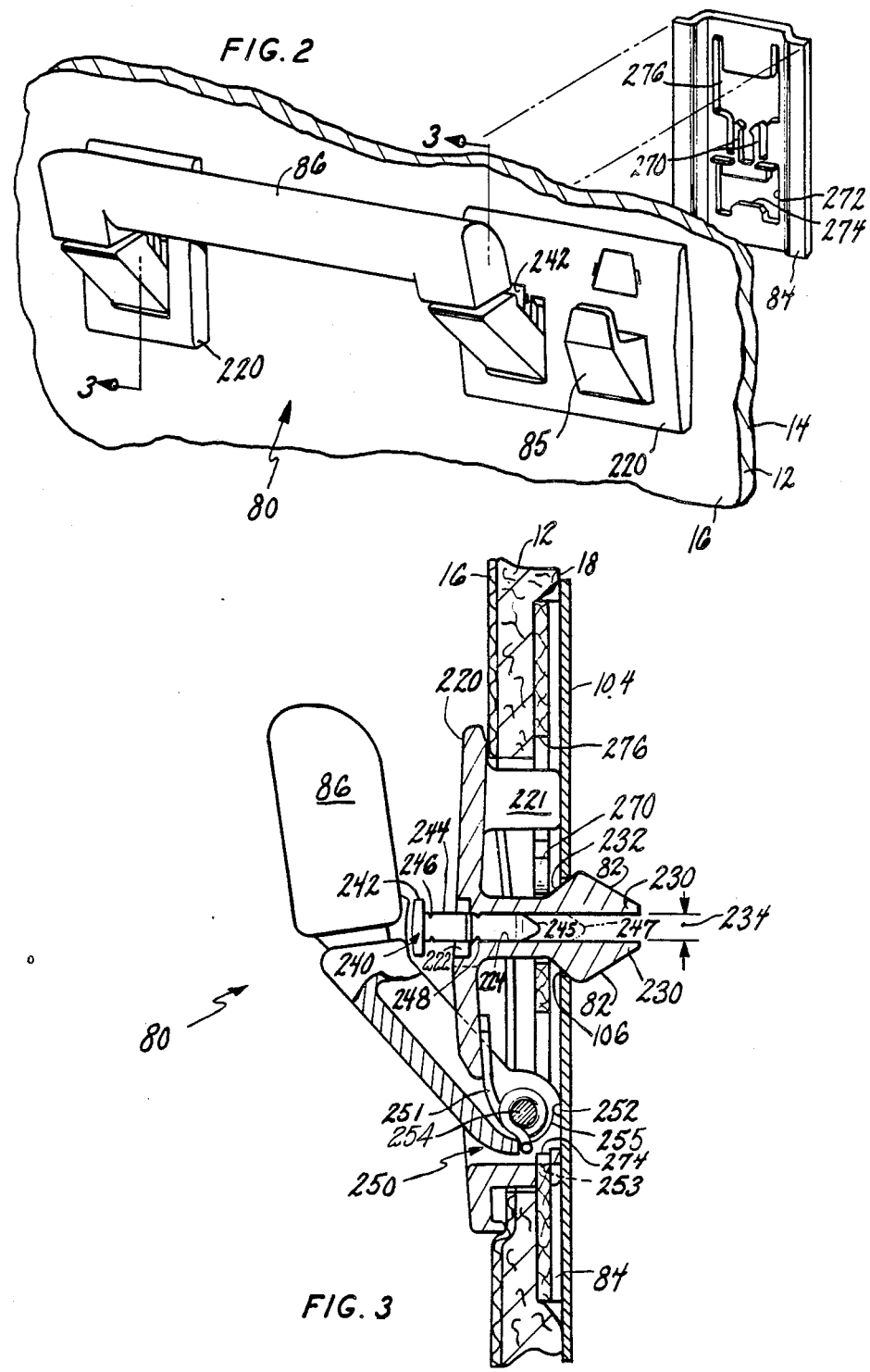

ASSIST STRAP FOR A MOTOR VEHICLE

CROSS REFERENCE TO RELATED APPLICATIONS

This application relates to the following simultaneously filed patent applications: U.S. application Ser. No. 204,804, now U.S. Pat. No. 4,913,484, for HEADLINER AND SUNSHADE FASTENER by James D. Dowd, David M. Hilborn, Roy Weilant and Abdolhossein R. Lawassani; U.S. application Ser. No. 204,663, now U.S. Pat. No. 4,893,866, for MOTOR VEHICLE BODY STRUCTURE FOR RECEIVING SNAP-FIT MODULAR HEADLINER FASTENERS by James D. Dowd and David M. Hilborn; U.S. application Ser. No. 204,662, for ASSIST STRAP FOR A MODULAR HEADLINER by James D. Dowd, David H. Hilborn, Matthew J. Brown and Richard P. Bozyk; U.S. application Ser. No. 205,139, now U.S. Pat. No. 4,902,068, for MODULAR HEADLINER ASSEMBLY by James D. Dowd and Darrel Hampton; U.S. application Ser. No. 205,257, now abandoned, for SUNSHADE WITH SNAP-FIT FASTENER by James D. Dowd, David M. Hilborn, Roy Weilant and Abdolhossein R. Lawassani; U.S. application Ser. No. 205,150, for SUNSHADE FASTENER MODULE FOR USE WITH MODULAR HEADLINER by James D. Dowd, David M. Hilborn, Roy Weilant, and Abdolhossein R. Lawassani; U.S. application Ser. No. 205,130, now U.S. Pat. No. 4,844,533, for FRONT LAMP MODULE AND SUNSHADE SUPPORTS FOR MODULAR HEADLINER by James D. Dowd, David M. Hilborn, Roy Weilant, and Abdolhossein R. Lawassani; U.S. application Ser. No. 205,265, now U.S. Pat. No. 4,893,867, for CONSOLE MOUNTED TO A HEADLINER by David M. Hilborn and Stephen P. McGarry; U.S. application Ser. No. 205,131, now abandoned, for MODULAR HEADLINER INCLUDING A WIRE HARNESS by James D. Dowd, Darrel Hampton, and Stephen P. McGarry.

TECHNICAL FIELD

The present invention relates to an assist strap for use in a motor vehicle. More specifically, the assist strap is designed for use in the interior of a motor vehicle adjacent a door opening to provide a grab handle to be used by the vehicle occupant.

BACKGROUND OF THE INVENTION

Various assist straps and grab handles have been utilized in vehicles and are typically located adjacent the door opening to provide a support which may be utilized by an occupant of the vehicle to assist the occupant in either entering or exiting the vehicle. These supports have been fastened to the body structure of the motor vehicle with screw rivets or a similar fasteners. The herein described assist strap is mounted without the use of any such fastening devices.

The assist strap as described herein includes projecting fastening means extending from an assist strap base, the fastening means having a contact surface which extends through an opening defined by a sheet metal structure to engage the sheet metal adjacent the opening. These flexible legs are compressed when inserted through the opening and thereafter expand to engage the sheet metal adjacent the opening. To lock the fastening means within the opening, a mandrel is slidably displaced between the legs to prevent the legs from being compressed thereby securing the fastening legs to the sheet metal adjacent the opening.

A handle is mounted to the base of the assist strap for pivotal displacement. A spring is utilized to bias the handle to a storage position However, prior to assembly a breakaway tab is utilized to lock the handle in position relative to the base. The breakaway tab overcomes the bias of the spring to maintain the handle in position until such time as the breakaway tab is ruptured.

The mandrel is provided for sliding displacement between a first position where it does not prevent displacement of the legs such that the assist strap may be fastened, and a second position wherein the mandrel is secured between the legs to lock the legs in the assembled position. The mandrel extends outwardly from the base of the assist strap when in the nonassembled position. The handle is appropriately positioned such that displacement of the handle effects contact with the mandrel to drive the mandrel from the first position to the second position.

The breakaway tab is sized such that upon an application of sufficient force to the handle to drive the mandrel from the first position to the second position, the breakaway tab will be ruptured. Hence, the breakaway tab may be sized to tune the amount of force necessary to rupture the tab and consequently the amount of force necessary to drive the mandrel from the first position to the second position to lock the assist strap in the assembled position.

Furthermore, the handle is appropriately configured such that the application of force to the mandrel from the handle is applied axially to the mandrel to prevent bending forces. Hence, the applied force is concentrated in the desired direction. Additionally, the handle has a smooth sliding surface coacting with the mandrel at the surface such that frictional forces therebetween are reduced.

The assist strap base may define a larger diameter opening and a smaller diameter opening and the mandrel may include a head which is sized to fit within the large diameter opening and a body portion which fits within the smaller opening. When the handle drives the mandrel to the second position, the head is engaged flush with the base of the assist strap providing an appropriately pleasing appearance to the assist strap in the assembled position.

Should the mandrel be driven between the fastening legs prior to assembly of the assist strap to the vehicle body structure, then assembly of the assist strap will be prevented. It is necessary to have the mandrel in the first position such that the fastening legs may be compressed to allow the legs to slide through the opening in the body sheet metal structure to allow assembly of the assist strap in the first place. Hence, the operator will not be able to assemble the assist strap unless the mandrel is in the first position, and once assembled, the operator must apply sufficient force to break the breakaway tab, which force will be sufficient to drive the mandrel to the second position assembling the assist strap to the motor vehicle. Hence, a highly reliable means for mounting the assist strap to a motor vehicle has been provided.

Although described herein as an assist strap, the means for mounting an assist strap to a vehicle is applicable to mounting any accessory to the motor vehicle. Such an accessory may include a lighting module, a coat hook, a combination assist strap and coat hook, a hanger, a display, a console or similar type devices.

Additionally, the assist strap or accessory as used in a motor vehicle typically is mounted to extend from a decorative surface side of a substrate through the substrate and then into the vehicle body structure. Hence, the base of the assist strap or accessory serves to trap the substrate between the base and vehicle body structure thereby securing the substrate in the desired position. In this manner, additional structural integrity or support may be provided to the substrate or other interior decorative components of the vehicle while mounting the assist strap or accessory to the motor vehicle.

SUMMARY OF THE INVENTION

It is an object of the present invention to provide an assist strap which may be mounted in a motor vehicle.

A further object of the present invention is to provide an assist strap which includes means for locking the assist strap to the motor vehicle such that the assist strap may not be inadvertently removed therefrom The invention further includes means for tuning the amount of force that must be applied to the assist strap handle to assure that the force is sufficient to drive a mandrel to lock the assist strap to the motor vehicle.

Another object of the present invention is to provide an economical, reliable, easy to use and manufacture assist strap for use with a motor vehicle.

Other objects will be apparent from the description to follow and the appended claims.

The above objects are achieved according to a preferred embodiment by the provision of an assist strap for use in a motor vehicle which includes a base having a handle mounting area, a handle mounted to the base at the handle mounting area, projecting fastening means extending from the base, said fastening means including at least one contact surface for engaging the surface to which the assist strap may be mounted, and mandrel means mounted for sliding movement relative to the fastening means between the first position disengaged from the fastening means and a second position wherein the mandrel engages the fastening means to limit movement of the fastening means.

Also disclosed is an accessory for installation within the interior of a motor vehicle having a body structure defining openings therethrough. The accessory includes a base to which other components of the accessory may be mounted, a pair of longitudinally extending spaced apart legs projecting from the base, said legs including at least one end portion having a contact surface angled away from the legs, said end portion being spaced from the base and said end portion being sized to allow both legs when compressed together to simultaneously fit through a body structure opening such that said contact surface thereafter engages the body structure adjacent the opening on the opposite side of the body structure from the base and a mandrel is mounted between the legs for sliding motion between a first position wherein the legs may be compressed and a second position wherein the mandrel occupies the space between the legs at the end portion thereof thereby preventing the legs from being compressed.

BRIEF DESCRIPTION OF THE DRAWINGS

FIG. 2 is a perspective view of an assist strap and retainer.

FIG. 3 is a sectional view of an assist strap and a retainer of FIG. 2 taken at the indicated line.

DESCRIPTION OF THE PREFERRED EMBODIMENT

The invention will be described with reference to a specific embodiment or embodiments hereof. It is understood that this invention has applicability with minor modifications to many vehicle lines, body styles, trim levels and structures, and it is to be anticipated that various changes can be made to the disclosed embodiments within the spirit and scope of the invention.

Figure 1:
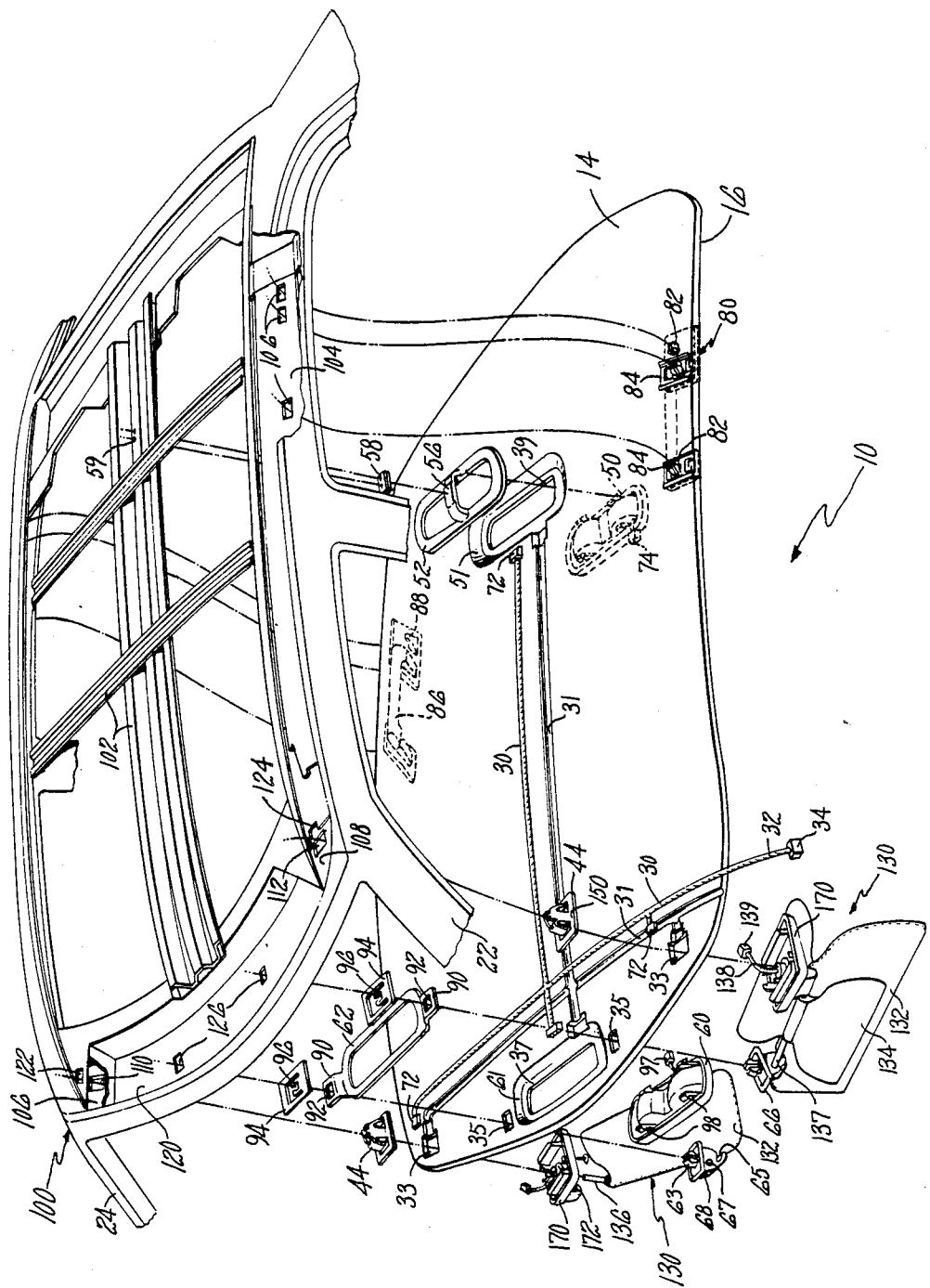
FIG. 1 is an exploded perspective view of a modular headliner assembly and appropriate portions of the vehicle body structure.

In FIG. 1 an exploded view of a modular headliner about to be mounted to a vehicle body structure is shown. In this view it may be seen that modular headliner 10 incorporates many various subassemblies such that all the appropriate subassemblies are mounted to the modular headliner and such that may be readily fastened to the vehicle body structure.

The wire harness 30 of the modular headliner assembly includes a series of accessory connectors 72 adapted to be connected to the appropriate electrical accessory mounted to the headliner. The wire harness assembly is further shown slightly exploded from channels 31 formed in the substrate for securing the headliner wire harness therein. This wire harness assembly is shown somewhat schematically and may, in fact, be located at different positions about the headliner, such positions being chosen for having optimum room for securing wires therein and for providing optimum space between the headliner and the vehicle body structure to prevent any accidental contact therebetween.

The center console 50 is shown having a complementary connector 74 extending therefrom for connection to accessory connector 72. Front console 60 has a complementary connector 97 and sunshade module 130 has a complementary connector 139, designed to be connected to accessory connectors 72 to form the integrated wire harness of the modular headliner assembly.

Center console 50 and forward console 60 are shown somewhat in schematic format. It is to be understood that these consoles may include features such as overhead lights, reading lights, displays, vanity mirrors, garage door opener compartments switches, and other control features such that a modular headliner wire harness may include a significant number of conductors. Additionally, the sunshade modules as shown are anticipated to be sunshade modules incorporating illuminated vanity mirrors which likewise require a power supply.

Center console 50 is mounted through a substrate center module opening 39 formed in depressed portion of the substrate 51 to retainer 52 mounted on the opposite side of the substrate. Retainer 52 may have extending wings which act to distribute the load of the console over a wide area of the substrate such that uneven loading or distortion during the shipping or handling process is avoided. The substrate about the console is depressed and defines an opening therein. The console covers the end of the depression including the opening to form a neat, highly attractive module.

Mesh fastener 56 attached to a back portion of the retainer or alternatively to the console is designed to interact with mesh fastener 58 secured at location 59 to the roof bows of the vehicle body structure. This mesh retainer is preferably DUAL LOCK ® retainer. By the selection of such a retainer, it is possible that the headliner may slide into position with one portion of the DUAL LOCK ® fastener sliding relative to the other. The DUAL LOCK ® fastener has the property that it does not grab and lock until the two fasteners are forced one into the other such as when the substrate is displaced upwardly locking it into its final position. Prior to such time, the headliner and the two mesh portions may be slid relative to one another to allow positioning and alignment of the headliner. This is quite different than other mesh fasteners which grab upon contact and may not thereafter be readily displaced.

Front console 60 is shown having snap legs 98 which extend upwardly through substrate front console opening 37 formed in depressed portion 61 to engage retainer 62. Retainer 62 has wings 90 which define wing openings 92. Inboard sunshade supports 66 and 68 extend with fastening legs 63 projecting upwardly through substrate openings 35, through retainer openings 92 and are secured in position by retainers 94 including spring legs 96 and, upon final assembly, extend through header openings 126 in the vehicle body structure. Each of the inboard sunshade supports 66 and 68 includes a receptacle for secondary visor 67 and a slot for receiving primary visor 65. As is seen in reference to sunshade module 130, the module includes a primary visor 132 and a secondary visor 134. The primary visor is mounted on the pivot rod 136 and the secondary visor is mounted on the pivot rod 137. The sunshade module further includes fastener 44 having a base 170, cover 150 and wires 138 extending therebetween. The primary visor is mounted for pivoted movement with pivot rod 136 and for rotation about the pivot rod 136 between a stored position against the headliner and a downward position to shield an occupant's eyes from sunlight entering through the windshield. When the primary visor is pivoted to block the sunlight coming through the side window, then the secondary visor may be rotated downwardly to block sunlight entering in through the windshield.

Assist straps 80 include projecting legs 82 projecting through the headliner substrate. Retainer clips 84 are shown in engagement with legs 82 to secure the assist straps to the headliner. An assist strap may include handle 86 and a coat hook 85, and is mounted in an appropriate position to provide a grab handle for an occupant entering or leaving the vehicle. Assist strap openings 106 are shown defined by inside rail 104 of the vehicle body structure 100. It is to these assist strap openings 106 that legs 82 engage to hold the assist strap and consequently the modular headliner in position. Fastener 44 engages the vehicle body structure through left A-pillar opening 112 formed in left A-pillar inner 108, a portion of A-pillar 22. In the same manner, right fastener 44 is inserted through the right A-pillar opening 110 of right A-pillar inner 106, a portion of right A-pillar 24. Both fasteners are likewise mounted through header left sunshade fastener 124 and header right sunshade fastener 122 openings, both being openings in header 120.

Vehicle body structure 100 as shown includes a series of roof bows 102 and the header and A-pillars as previously mentioned. Additionally, vehicle body structure 100 includes side rail 104 defining openings 106 to which the various assist strap legs may be engaged.

Hence, it may be seen from FIG. 1 that the entire modular headliner assembly may be secured to the vehicle body structure with the vehicle body structure merely providing appropriately sized and positioned openings. No other structure need be added to the vehicle body structure to allow the modular headliner to be secured thereto. All the fasteners for securing the modular headliner are affixed to the modular headliner such that the vehicle assembler need only mount the modular headliner to the vehicle body structure and need not add any intermediate fastener or receptacles.

Figure 4:
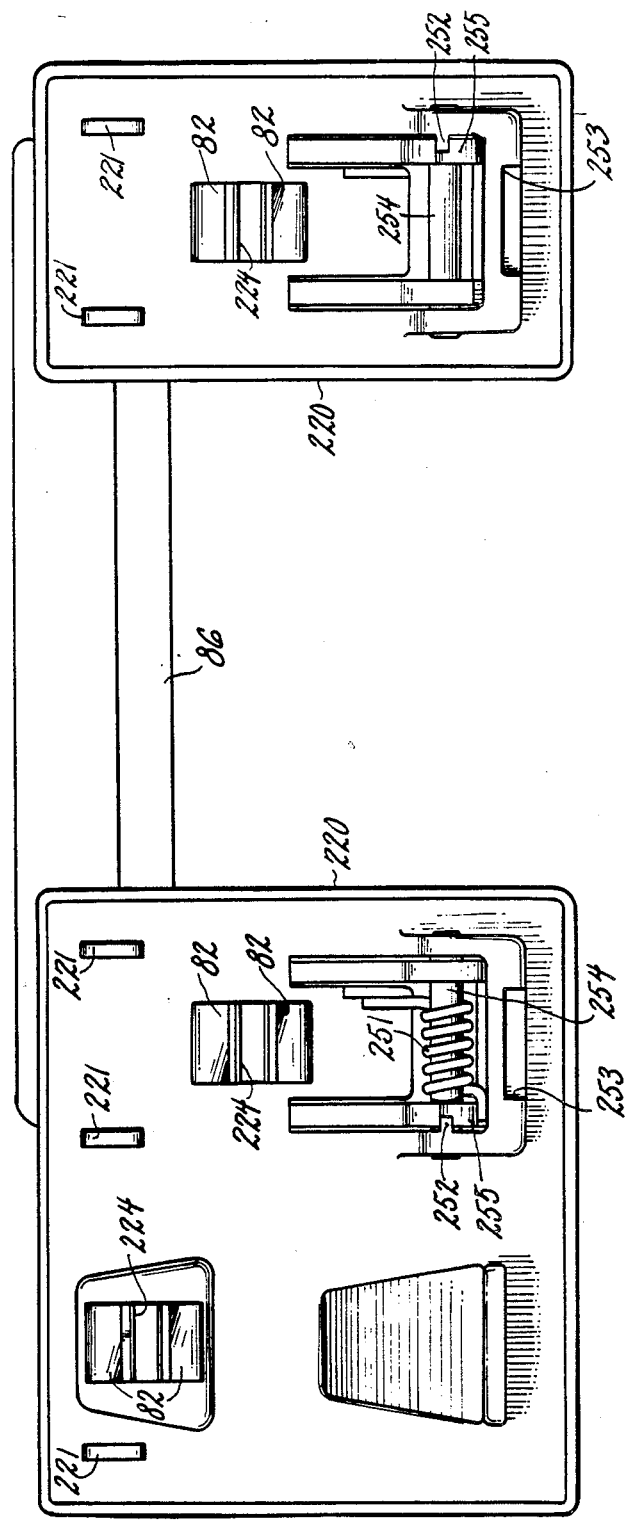
FIG. 4 is a rear view of the assist strap as shown in FIG. 2.

FIGS. 2, 3 and 4 all disclose various portions of an assist strap assembly. FIG. 2 is a perspective view of an assist strap assembly and retainer to be mounted thereto FIG. 3 is a sectional view of an assist strap assembly showing a mandrel in a first position when it does not secure the legs to the side rail inner and a second position wherein the assist strap is secured to the vehicle body structure by the mandrel locking the legs to the side rail. FIG. 4 is a rear view of the assist strap assembly.

As may be seen in the Figures, base 220 has coat hook 85 and grab handle 86 extending therefrom. The entire arrangement is referred to as an assist strap 80. Base 220 may be divided into two portions as shown or may be a unitary base extending the entire length of the assist strap. The base handle mounting area 250 is that portion to which handle 86 is mounted for pivotal motion. Spring 251 is utilized to bias the handle 250 in the upward direction. Pivot rod 254 extends through the handle and acts to mount the handle for pivotal movement The handle further includes a notch 255 for receipt of the breakaway tab 252. As can be seen more specifically in FIG. 4, breakaway tab 252 extends from the base to the handle such that the position of the handle is maintained until the breakaway tab is ruptured. The handle may include an inclined surface leading to notch 255 to facilitate assembly of the handle to the base.

Mandrel 240 includes a head 242 and a body 244. The mandrel is shown in first position 245 in solid and in second position 247 with dotted lines. In the first position, the mandrel does not impact the movement of legs 82, however, in the second position, the mandrel occupies leg gap 234 between legs 82 to prevent them from being displaced inwardly.

Legs 82 are appropriately sized and include flared end 230 such that as the assist strap is assembled to the vehicle, the flared ends engage assist strap openings 106 and are forced together or compressed as the assist strap is pushed into position. Once the flared end 230 passes through the opening, the legs expand outwardly and contact surfaces 232 engage side rail inner 104 to maintain the assist strap mounted to the side rail inner. The substrate is shown in the manner which the substrate is secured by the base to the side rail.

As specifically seen in FIG. 3, the mandrel is displaced from the first position to the second position wherein the legs 82 are maintained with the contact surface 232 engaging side rail inner 104. With the mandrel being placed in leg gap 234, the legs may not be compressed, and hence the assist strap may not be removed from the side rail inner.

During the assembly process, the assembler will place the assist strap in position as a portion of the modular headliner assembly or as a separate element if desired and will then cause the legs to pass through the assist strap opening. Once the assembler feels the legs pass through the assist strap opening, he may then decide to drive the mandrel from the first position to the second position. The mandrel may be appropriately displaced by the assembler smacking handle 86 with his hand with sufficient force to drive the mandrel from the first position to the second position.

The handle provides means for tuning the force to assure that the mandrel is driven from the first position to the second position. Breakaway tab 252 extends between notch 255 in the handle to base 220. The size and material of this tab are selected such that the force necessary to rupture the tab is sufficient to force the handle against the mandrel to assure the mandrel moves from the first position to the second position Hence, as the handle is smacked by the operator, the tab is ruptured and the handle continues to move toward the base driving the mandrel from the first position to the second position.

Base 220 includes a base opening 224 for the mandrel body and base opening 222 for the mandrel head. When the mandrel is moved to the second position, the mandrel head is contained within base opening 222 to provide an assist strap with an overall neat appearance. Additionally, notches 246 of mandrel 240 mate with protuberances 248 to secure the mandrel in the second position. (Prior to that, the protuberance 248 rests in a second notch, profiled in FIG. 3.) In this manner, the assist strap acts to lock the base and the substrate contained therebetween to the side rail inner to secure the modular headliner or to secure the assist strap to the vehicle body structure. In this position, the base at the handle mounting area and at engagement projections 221 engages side rail inner 104 to provide stability and support to the assist strap.

When the assist strap is part of a modular headliner, it is necessary to secure the assist strap to the substrate prior to assembly of the modular headliner to the vehicle body. To accomplish this, retainer clip 84, a planar member, is mounted to the assist strap behind the substrate such that the substrate is sandwiched between the base and the retainer clip to secure the assist strap to the substrate. The retainer clip includes leg opening 276 through which legs 82 may pass and a handle mounting opening 272 through which the handle mounting area 250 may pass. Spring arms 270 are part of the retainer clip and are designed to engage around legs 82. Tab 274 extends into handle mounted opening 272 and is positioned to engage notch 253 of the mounting area.

Hence, when the assist strap is assembled to the modular headliner substrate, a portion of the assist strap is inserted through the appropriate substrate opening. The retainer is then located with the leg opening over the legs and the handle mounting opening over the handle mounting area. The retainer is then slidably displaced such that spring arms 270 engage around legs 82 and such that tab 274 engages with notch 253. In this manner, the retainer is secured to the assist strap with the substrate sandwiched therebetween to hold the assist strap to the substrate. The retainer is left in position when the modular headliner is mounted to the vehicle body structure.

When the assist strap is utilized other than with a modular headliner, the retainer is not necessary. The assist strap will simply be mounted by inserting the legs through appropriate opening in the substrate, if one is used, and then through the side rail inner or other sheet metal structure of a vehicle body structure. The setting of the mandrel will thereafter be the same.

It is to be noted that the contact surface between handle 86 and mandrel head 242 is smooth such that a sliding action between the two there will occur without any transverse forces being applied. Additionally, the contact area is appropriately designed such the forces applied from the handle to the mandrel are applied along the axis of the mandrel and are not bending forces.

The invention has been described with reference to a particular embodiment It is to be understood by those skilled in the art that variations and modifications can be made within the spirit and scope of the invention.

We claim:

1. An assist strap for use in a motor vehicle which comprises:
    a base including a handle mounting area;
    a handle mounted to the base at the handle mounting area;
    projecting fastening means extending from the base, said fastening means including at least one contact surface for engaging a surface to which the assist strap may be mounted; and
    mandrel means mounted for sliding movement relative to the fastening means between a first position disengaged from the fastening means and a second position wherein the mandrel engages the fastening means to limit movement of the fastening means;
    wherein the handle is mounted to the base for pivotal displacement relative to the base and wherein the handle is positioned to engage the mandrel means such that upon sufficient pivotal displacement of the handle, the handle contacts the mandrel means and acts to displace the mandrel means from the first position to the second position.

2. The apparatus as set forth in claim 1 wherein the projecting fastening means further comprises at least one resilient, longitudinally extending projecting leg which defines a contact surface angled from the longitudinal direction of the leg to engage a surface to which the assist strap may be mounted.

3. The apparatus as set forth in claim 1 wherein the projecting fastening means comprises a pair of space, longitudinally extending projecting legs, each having a contact surface angled in different directions from the longitudinal direction of the leg.

4. The apparatus as set forth in claims 2 or 3 wherein the mandrel means comprises a longitudinally extending mandrel which when placed in the second position engages each projecting leg to prevent the leg from flexing thereby preventing the contact surface from being displaced.

5. The apparatus as set forth in claim 1 and further comprising bias means for biasing the handle for pivoted movement and breakaway locking means extending between the handle and the handle mounting area to secure the handle in a desired position rendering the bias means ineffective as long as the breakaway locking means remains unbroken.

6. The apparatus as set forth in claim 5 wherein a force is required to break the locking means the breakaway locking means further comprises said locking means being dimensioned to establish the force required to break the locking means.

7. The apparatus as set forth in claims 5 or 6 wherein the breakaway locking means is a tab extending from the handle to the handle mounting area at the base to the handle.

8. The apparatus as set forth in claim 5 wherein a force is required to be applied to the handle to displace the mandrel from the first position to the second position and the force to break the locking means is greater than the force required to be applied to the handle to displace the mandrel from the first position to the second position.

9. The apparatus as set forth in claim 1 wherein the handle is configured to provide a smooth curved surface in engagement with the mandrel means such that force applied by the handle is transmitted to the mandrel primarily in the direction of sliding movement of the mandrel.

10. The apparatus as set forth in claim 1 wherein the projecting fastening means further comprises a protuberance extending generally perpendicular to the direction of sliding movement of the mandrel means and wherein the mandrel means defines a notch sized to receive the protuberance whereby upon the mandrel means being displaced to the second position the protuberance engages the notch to secure the mandrel means in the second position.

11. An accessory for installation within the interior of a motor vehicle having a body structure defining openings therethrough, which comprises:
 a base to which other components of the accessory may be mounted;
 a pair of resilient longitudinally extending spaced apart legs projecting from the base;
 said legs including at least one end portion having a contact surface angled away from the leg, said end portion being spaced from the base and said end portion being sized to allow both legs when compressed together to simultaneously fit through a body structure opening such that said contact surface thereafter engages the body structure adjacent the opening on the opposite side of the body structure from the base;
 a mandrel mounted between the legs for sliding motion between a first position wherein the legs may be compressed and a second position wherein the mandrel occupies the space between the legs at the end portion thereof thereby preventing the legs from being compressed; and
 the motor vehicle including a headliner having a decorative surface and defining an opening therein and wherein the legs are positioned to extend through the opening in the headliner as well as the body structure opening and wherein the base includes a surface visible to the vehicle occupants, said surface visible to the occupants hiding the legs of the accessory from the view of the occupants and comprising at least one surface which extends from said base to engage a surface of the vehicle body structure to stabilize the accessory, said surface visible to the occupants comprising an accessory mounting area, and
 wherein the accessory includes a handle pivotally mounted to the base, said handle being positioned to engage the mandrel in the first position such that applying force to the handle will cause the mandrel to be displaced from the first position to the second position.

12. The apparatus as set forth in claim 11 wherein at least one leg includes a protuberance and wherein the mandrel contains at least one notch, the protuberance being positioned to engage the notch when the mandrel is one of the first or second positions.

13. The apparatus as set forth in claim 12 wherein the mandrel defines a second notch spaced from the first notch and wherein the protuberance engages said one notch to maintain the mandrel in the first position and a second notch to maintain the mandrel in the second position.

14. The apparatus as set forth in claim 11 wherein the base defines an opening therethrough, said opening having a larger diameter portion extending partially through the base and a small diameter opening extending through the remainder of the base; and wherein the mandrel has a head portion sized to fit within the larger diameter portion and a body portion sized to fit within the small diameter portion of the base when the mandrel is displaced to the second position.

15. The apparatus as set forth in claim 11 wherein the accessory is a coat hanger.

16. The apparatus as set forth in claim 11 wherein the accessory is a console.

17. The apparatus as set forth in claim 11 wherein the accessory is a lamp housing.

18. A method for installing an assist strap to a surface, the strap having a handle hinged on a base containing a projection that is operable by moving a mandrel inserted therein, to cause the projection to engage the surface, characterized by the steps:
 (a) locating the base on the surface; and
 (b) rotating the handle to cause the mandrel to move and operate the projection.

19. The method according to claim 18, further characterized by:
 (c) breaking a locking means connecting the base and the handle with the rotation of the handle as it moves the mandrel.

* * * * *

UNITED STATES PATENT AND TRADEMARK OFFICE
CERTIFICATE OF CORRECTION

PATENT NO. : 4,981,322
DATED : January 1, 1991
INVENTOR(S) : James D. Dowd et al It is certified that error appears in the above-indentified patent and that said Letters Patent is hereby corrected as shown below:

Column 3, line 22, "therefrom" should read --therefrom.--

Column 7, line 11, "position" should read --position.--

Signed and Sealed this

Twenty-ninth Day of March, 1994

Attest:

BRUCE LEHMAN

*Attesting Officer*     *Commissioner of Patents and Trademarks*